United States Patent
Yamazaki et al.

[11] Patent Number: 5,884,162
[45] Date of Patent: Mar. 16, 1999

[54] 1×N COMMUNICATION SYSTEM FOR PRIVATE BRANCH EXCHANGE

[75] Inventors: Shigeru Yamazaki; Akihiko Hiramatu; Kazuo Seko, all of Amagasaki, Japan

[73] Assignee: Mitsubishi Denki Kabushiki Kaisha, Tokyo, Japan

[21] Appl. No.: 910,219

[22] Filed: Jul. 9, 1992

[30] Foreign Application Priority Data

Jul. 10, 1991 [JP] Japan .................................... 3-195044
Sep. 13, 1991 [JP] Japan .................................... 3-234312

[51] Int. Cl.⁶ .................................................. H04Q 7/20
[52] U.S. Cl. .......................... 455/416; 455/403; 455/555; 379/159
[58] Field of Search ....................... 379/58, 63, 156–161, 379/167, 168

[56] References Cited

U.S. PATENT DOCUMENTS

| | | | |
|---|---|---|---|
| 4,203,011 | 5/1980 | Coviello | 379/159 |
| 4,313,033 | 1/1982 | Walker et al. | 379/167 X |
| 4,554,411 | 11/1985 | Armstrong | 379/160 X |
| 4,748,655 | 5/1988 | Thrower et al. | 379/58 X |
| 4,754,476 | 6/1988 | Rasmussen et al. | 379/159 |
| 4,882,746 | 11/1989 | Shimada | 379/61 |

*Primary Examiner*—Dwayne D. Bost
*Assistant Examiner*—William G. Trost
*Attorney, Agent, or Firm*—Rothwell, Figg, Ernst & Kurz

[57] ABSTRACT

A press-talk trunk is a communication system receives press-talk signals from voice terminals having press-talk switches. In one aspect of the invention, the press-talk trunk is scanned by a central controller that selects an active press-talk signal and sets up a corresponding 1×N voice communication path among the terminals. In another aspect of the invention, the press-talk truck itself selects an active press-talk signal and notifies the central controller by means of an interrupt. In yet another aspect of the invention, the press-talk trunk also receives voice signals from all the terminals, selects a voice signal from a terminal having an active press-talk signal, and sends that voice signal back to all the other terminals. In still another aspect of the invention, two or more press-talk trunks are cascaded.

23 Claims, 7 Drawing Sheets

1×N COMMUNICATION SYSTEM FOR PRIVATE BRANCH EXCHANGE

BACKGROUND OF THE INVENTION

This invention relates to a communication system enabling N people to use a switching system such as a private branch exchange for 1×N communication (N being an integer greater than two).

The modern private branch exchange is a digital electronic device comprising a time-division switch and a central controller. The central controller can be programmed to implement a variety of services besides what is technically referred to as "plain old telephone service" (POTS). One of these additional services is a 1×N communication service known, for example, as announcement or broadcast service. This service can be utilized for communication among employees of a department store, hotel, hospital, or other organization.

A prior-art 1×N communication scheme employs standard extension telephone sets coupled to a private branch exchange, either by wires or by wireless links. Information designating N of these extension telephone sets as a broadcast group is stored in a memory of the central controller. When a person at one of these N extension telephone sets wishes to make an announcement to the people in the broadcast group, he picks up the handset and performs a series of special operations, such as momentarily depressing the hook switch then dialing a special service code. The central controller responds by setting up a circuit in the private branch exchange that allows the person's voice to be heard at the rest of the N extension telephone sets in the group. At the end of the announcement, the person performs another special operation to release the circuit. If another person at one of the N extension telephone sets wants to reply to the announcement, he can do so by a similar series of operations.

One disadvantage of this prior-art scheme is that the numerous special operations required make it difficult and inconvenient to use. Each time a person wishes to speak, for instance, he must enter a special service code.

Another disadvantage is that the central controller must execute a special service program each time the service code is entered. This extra load reduces the ability of the private branch exchange to handle normal telephone traffic, leading to problems such as long call setup delays.

SUMMARY OF THE INVENTION

It is accordingly an object of the present invention to provide 1×N communication via a switching system without requiring entry of a special service code or other complex operations.

Another object of the invention is to provide 1×N communication without requiring a central controller to execute a special service program.

Still another object is to provide 1×N communication without requiring extensive wiring.

Yet another object is to enable a 1×N communication system to be expanded flexibly.

The invented 1×N communication comprises at least three voice terminals equipped with press-talk switches for generating press-talk signals, a switching system for switching communication paths among these terminals, a central controller for controlling the switching system, and a press-talk trunk that receives the press-talk signals from the terminals.

In one aspect of the invention, the central controller scans the press-talk trunk. When it finds an active press-talk signal, the central controller sets up a 1×N communication path in the switching system enabling the person who operated the press-talk switch that generated the active press-talk signal to speak to people at the other terminals. If more than one press-talk signal is active, the central controller selects a single press-talk signal.

In another aspect of the invention, the press-talk trunk itself detects and selects an active press-talk signal and notifies the central controller. The central controller then sets up a 1×N communication path in the switching system.

In yet another aspect of the invention, the press-talk trunk also receives voice signals from all the terminals, selects a voice signal from a terminal having an active press-talk signal, and sends that voice signal back to all the other terminals.

In still another aspect of the invention, two or more press-talk trunks are cascaded. Each press-talk trunk receives press-talk signals and voice signals. When a press-talk trunk receives one or more active press-talk signals, it selects a single active press talk signal and the corresponding voice signal. Signals selected by a lower-order press-talk trunk are input to a higher-order press-talk trunk.

BRIEF DESCRIPTION OF THE DRAWINGS

FIG. 3 illustrates a third novel 1×N communication system.

DETAILED DESCRIPTION OF THE INVENTION

The invented 1×N communication system will be described with reference to the attached drawings. The embodiments shown in these drawings are illustrations of the invention but they do not limit the scope of the invention, which should be determined solely from the appended claims. In the course of the description reference will be made to use of the invention in a hotel, but of course this is not a restriction; the invention can be advantageously applied in stores, schools, office buildings, and a wide variety of other settings as well.

Figure 1:
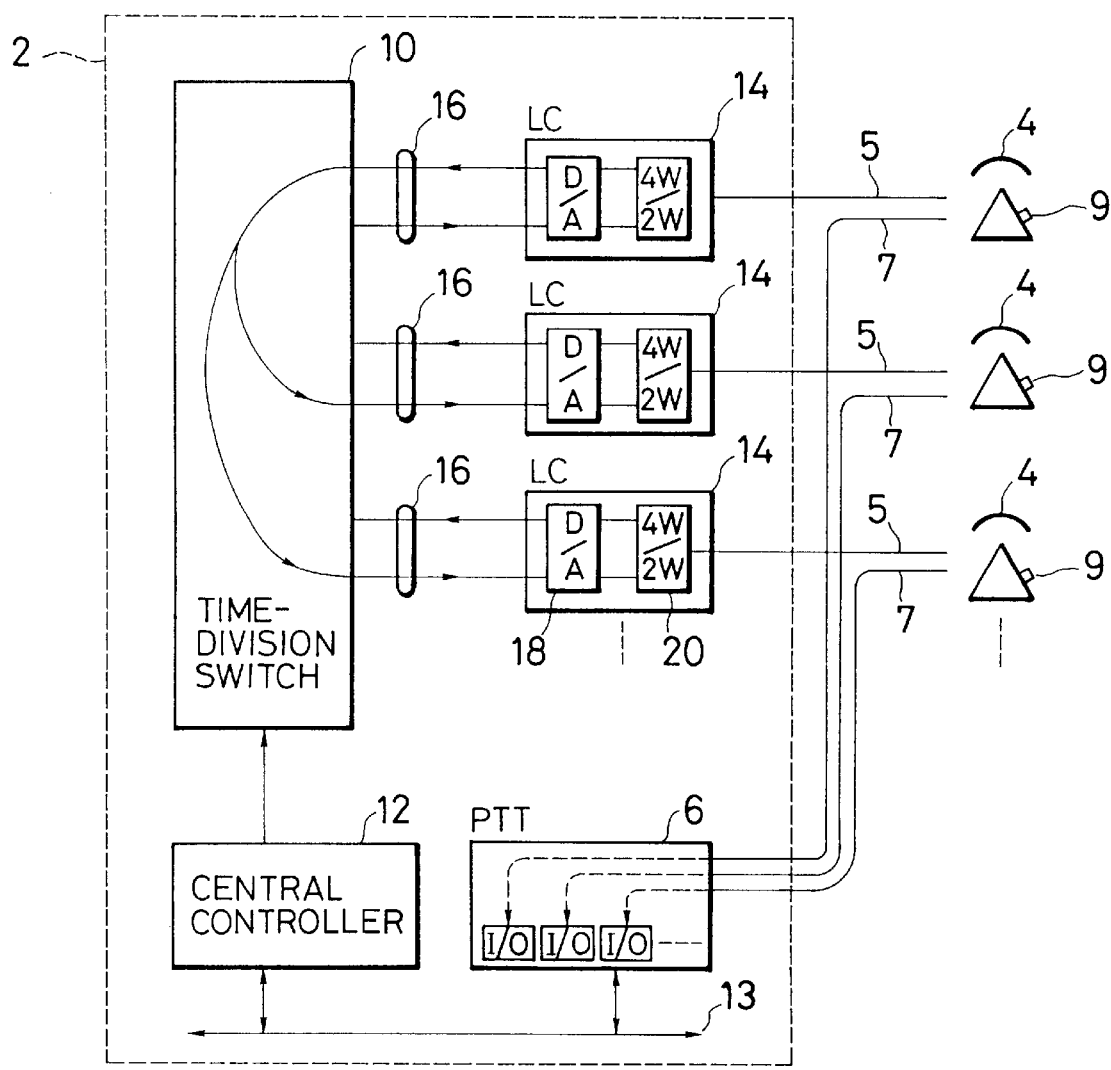
FIG. 1 illustrates a first novel 1×N communication system.

Referring to FIG. 1, a first novel 1×N communication system comprises a private branch exchange 2 and a plurality of terminals 4. The terminals 4 are installed, for example, at employee stations in a hotel, and are coupled to the private branch exchange 2 by wire pairs 5 for carrying analog voice signals. Although shown by a single line in the drawings, each wire pair 5 comprises two wires. The terminals 4 are also coupled to a press-talk trunk 6 in the private branch exchange 2 by press-talk wires 7 for carrying press-talk signals. The press-talk signal is in this case a simple on-off signal.

The terminals 4 are extension telephone sets having the usual handset and dial push buttons (or a rotary dial), and an additional press-talk pushbutton 9 labeled with, for example, the words "Press to Talk." The handset has a built-in microphone and speaker. Each terminal 4 preferably also has an external speaker that can operate even when the handset is on-hook.

The press-talk pushbutton 9 functions as a contact switch to produce the press-talk signal mentioned previously. The press-talk signal is active (on) when the press-talk pushbutton 9 is depressed and inactive (off) when the press-talk pushbutton 9 is not depressed.

The invention is not limited to the type of press-talk pushbutton just described. For example, the press-talk pushbutton may operate as a toggle control, in which case the press-talk signal changes between the active and inactive states each time the press-talk pushbutton is pressed. The invention can also be practiced using press-talk lever switches or other types of press-talk switches instead of pushbuttons.

The private branch exchange 2 is coupled not only to the terminals 4 but also to standard extension telephone sets not equipped with press-talk pushbuttons, and to one or more external lines for communication with a public telephone network. Standard extension telephone sets are installed, for example, in hotel guest rooms. The standard extension telephone sets and external lines are omitted from the drawings to avoid obscuring the invention with unnecessary detail.

The private branch exchange 2 has a time-division switch 10 that is coupled to and controlled by a central controller 12. The central controller 12 is also coupled via a control bus 13 to the press-talk trunk 6. The private branch exchange 2 further comprises a plurality of line cards 14 to which the wire pairs 5 are connected, and a plurality of four-wire internal highways 16 via which the line cards 14 are coupled to the time-division switch 10. The internal highways 16 carry digital signals in assigned time slots. Time-division switches, central controllers, line cards, and four-wire highways are well known, so the following description will be brief.

The time-division switch 10 is a switching system that establishes communication paths among the terminals 4 and other standard extension telephone sets, or between a terminal 4 or standard extension telephone set and an external telephone line. These paths are established by assigning and interchanging time slots. The central controller 12 is a digital computing device that executes programs for setting up and clearing communication paths in the time-division switch 10. The line cards 14 are interfaces between the terminals 4 and the private branch exchange 2; each comprises an analog-to-digital and digital-to-analog converter 18 and a two-wire/four-wire converter 20. These line cards 14 are identical to line cards (not shown) used for coupling the private branch exchange 2 to standard extension telephone sets. Structurally, the private branch exchange 2 is configured as a mainframe with slots for installing line cards 14 and the press-talk trunk 6.

The press-talk trunk 6 is in this case an extremely simple device comprising a plurality of I/O ports to which the press-talk wires 7 are coupled. Each I/O port outputs, for example, the logic value zero when the incoming press-talk signal is active, and the logic value one when the incoming press-talk signal is inactive.

Next the operation will be described for the case in which the press-talk pushbutton 9 is depressed at the uppermost terminal 4 in FIG. 1.

The control controller 12 rapidly and repeatedly scans the I/O ports in the press-talk trunk 6 by addressing them and reading their values in a cyclic manner. When it detects a logic zero at an I/O port, in this case the I/O port corresponding to the uppermost terminal 4, the central controller 12 sets up the voice communication path shown in the drawing in the time-division switch 10, linking the microphone at the uppermost terminal 4 to speakers (preferably external speakers) at the other terminals 4. The person at the uppermost terminal 4 in the drawing can then speak to people at the other terminals 4.

When he has finished speaking, the person at the uppermost terminal 4 releases the press-talk pushbutton 9. In scanning the I/O ports of the press-talk trunk 6, the central controller 12 now finds that the press-talk signal from the uppermost terminal 4 is inactive, so it clears the voice communication path shown in FIG. 1. After this, if someone at another terminal 4 wishes to speak, he can do so by pressing his own press-talk pushbutton 9.

The central controller 12 is programmed to accept only one active press-talk signal at a time. For example, after detecting a logic zero at an I/O port, the central controller 12 scans only that I/O port until that port reverts to the logic-one state. The central controller is also programmed to exclude from the 1×N communication path any terminals 4 that are currently making ordinary (1×1) telephone calls.

An advantage of the system in FIG. 1 is that it does not require any complex or difficult operations such as entry of a service code. A person who wishes to speak simply picks up the handset at his terminal 4, depresses the press-talk button 9, and starts talking.

Figure 2:
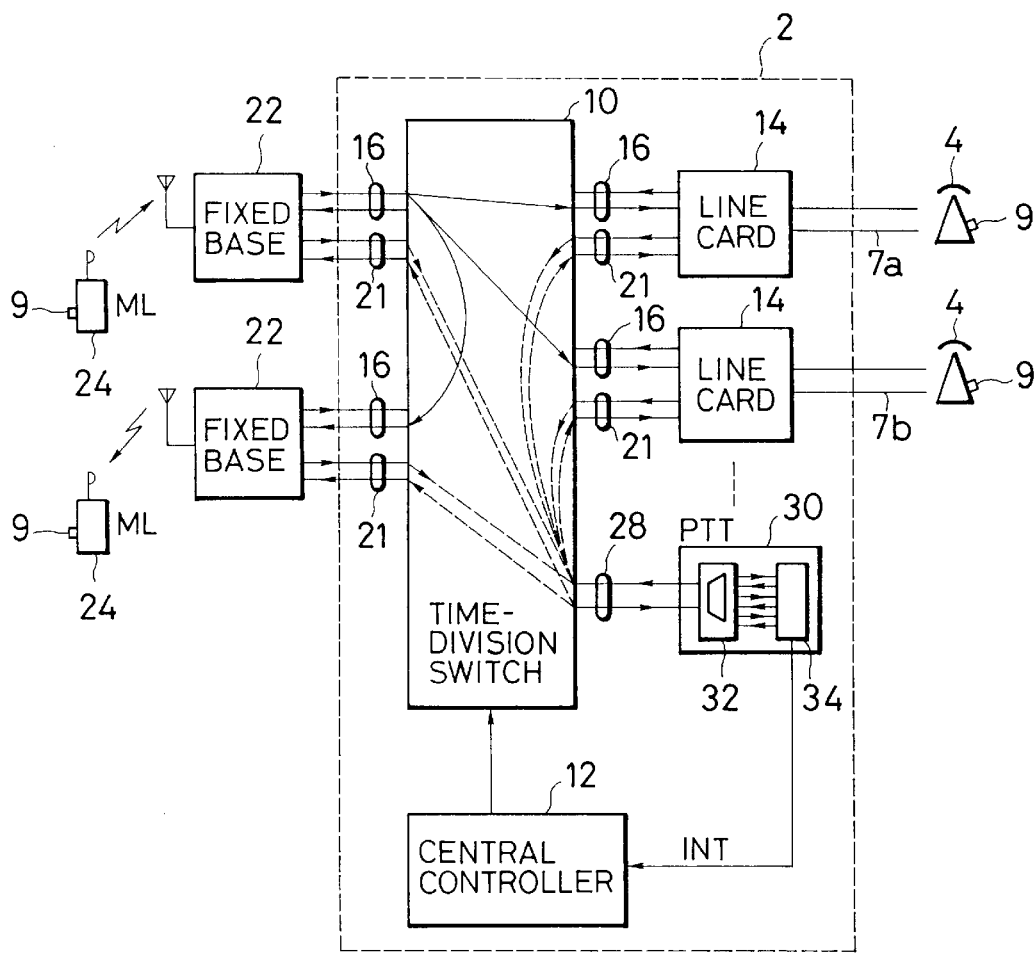
FIG. 2 illustrates a second novel 1×N communication system.

FIG. 2 shows a second novel 1×N communication system that accommodates both wired and wireless terminals. The private branch exchange 2, terminals 4, time-division switch 10, central controller 12, line cards 14, and internal highways 16 in FIG. 2 are generally similar to the elements with the same reference numerals in FIG. 1. Detailed descriptions will therefore be omitted, except to note that the line cards 14 are coupled to the time-division switch 10 not only by internal highways 16 but also by press-talk highways 21 which transmit press-talk signals from the terminals 4. The press-talk signals transmitted on these press-talk highways 21 are digital signals.

Like the internal highways 16, the press-talk highways 21 are four-wire highways with separate paths for incoming and outgoing signals. Besides press-talk signals, the press-talk highways 21 carry other signaling information such as identification codes identifying the terminals 4.

In addition to line cards 14, the system in FIG. 2 has a plurality of fixed base stations 22 installed at appropriate locations. A hotel, for example, may have one fixed base station 22 on each floor. Each fixed base station 22 has a transmitter, receiver, antenna, multiplexer, demultiplexer, and other standard components of base stations in wireless communication systems. Like the line cards 14, the fixed base stations 22 are linked to the time-division switch 10 by four-wire internal highways 16 and four-wire press-talk highways 21.

In addition to the terminals 4, the system in FIG. 2 has portable wireless terminals 24. In a hotel, wireless terminals 24 might be assigned to individual employees, to be worn or kept at hand while the employee is on duty. Each wireless terminal 24 is generally similar to a standard cordless telephone set, having a microphone, speaker, antenna, and battery power supply. Some or all of the wireless terminals 24 may have dial pushbuttons for making ordinary telephone calls. Each wireless terminal 24 has a press-talk pushbutton 9.

The wireless terminals 24 communicate with the fixed base stations 22 by means of wireless signals transmitted between their antennas. Although the two fixed base stations 22 in FIG. 2 are shown communicating with only one wireless terminal 24 apiece, a fixed base station 22 is capable of communicating simultaneously with a plurality of wireless terminals 24, using a different channel for each. Channels are assigned to wireless terminals 24 in the area served by a fixed base station 22, and calls are handed off when a wireless terminal 24 is carried from the area served by one fixed base station 22 to the area served by another fixed base station 22. Details of these processes will be omitted since they are well known.

The wireless links between the fixed base stations 22 and wireless terminals 24 may be digital or analog. The invention is not restricted to any particular wireless communication technology. The fixed base stations 22 can also communicate with standard cordless telephone sets, not shown in the drawing, which have dial pushbuttons but no press-talk pushbutton 9.

Since each fixed base station 22 has a plurality of channels, it multiplexes signals arriving on different channels form the wireless terminals 24 into a single signal sent on the internal highway 16, and demultiplexes signals from the internal highway 16 to different outgoing channels to the wireless terminals 24. Details of these processes will also be omitted; suffice it to say that different channels are assigned to different time slots on the internal highways 16.

The press-talk highways 21 are similarly multiplexed. The multiplexed press-talk signals from all the line cards 14 and fixed based stations 22 are sent via another press-talk highway 28 to press-talk trunk 30. Returning signals from the press-talk trunk 30 are sent to the line cards 14 and fixed base stations 22 via the press-talk highways 28 and 21.

In the press-talk trunk 30, a multiplexer-demultiplexer 32 demultiplexes the signals from the press-talk highway 28 and sends them to a discriminator 34. When an active press-talk signal arrives, the discriminator 34 notifies the central controller 12 in the private branch exchange 2 by generating an interrupt signal (INT). When two or more active press-talk signals arrived, the discriminator 34 selects the one that arrived first and notifies the central controller 12 of that signal only.

Figure 3:
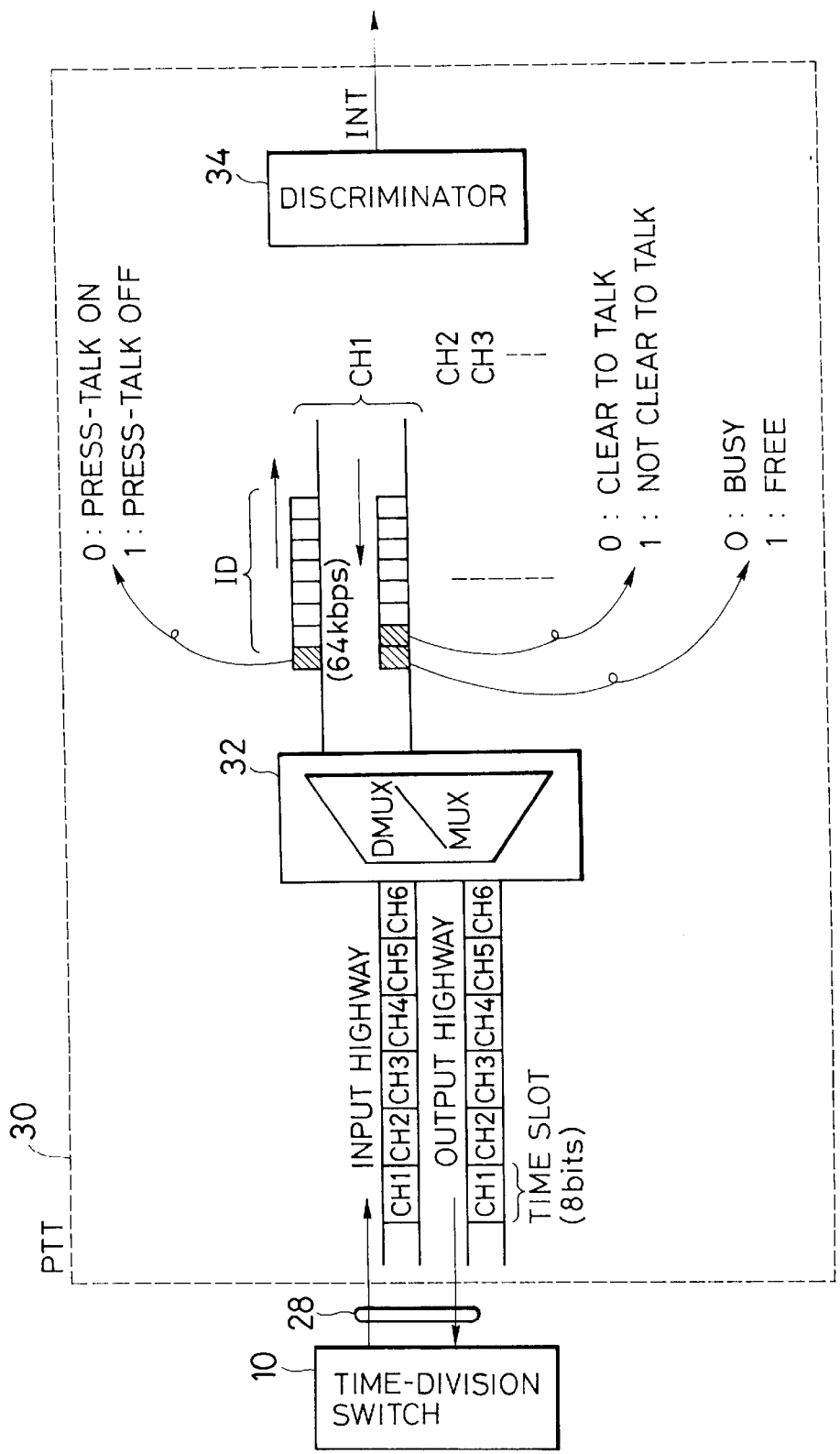
FIG. 3 is a more detailed drawing of the press-talk trunk in FIG. 2.

FIG. 3 is a more detailed drawing of the press-talk trunk 30 in FIG. 2, showing one way in which the signal interface can be implemented. The press-talk highway 28 carries data at an aggregate rate of, for example, 2.048 megabits per second. A total of, for example, thirty-two channels are multiplexed into this press-talk highway 28, each channel having a data rate of sixty-four kilobits per second. The channels are assigned to eight-bit time slots.

The multiplexer-demultiplexer 32 demultiplexes incoming data to thirty-two separate signal channels (CH1, CH2, CH3, . . . in the drawing), each having a data rate of sixty-four kilobits per second. Every 0.125 milliseconds, the discriminator 34 receives eight bits of data from each channel. The first of these eight bits is a press-talk flag that has the value zero to indicate depression of the press-talk pushbutton 9 at the corresponding terminal 4 or wireless terminal 24, or the value one to indicate that the press-talk pushbutton 9 is not depressed. The other seven bits are, for example, an identification (ID) code of the terminal 4 or wireless terminal 24 using the channel.

The discriminator 34 processes the incoming data and returns an eight-bit code to each of the thirty-two channels. The first bit in this return code is a busy/free flag indicating whether 1×N communication is currently in progress. This bit has the value zero when a press-talk pushbutton 9 at one of the terminals 4 or wireless terminals 24 is depressed, and the value one when none of the press-talk pushbuttons 9 is depressed. The second bit in the return code is a clear-to-talk flag indicating whether this specific channel has been selected by the discriminator 34, enabling the person at the corresponding terminal 4 or wireless terminal 24 to talk to people at other terminals. The other six bits are, for example, identification code bits of the terminal 4 or wireless terminal 24 selected by the discriminator 34.

The multiplexer-demultiplexer 32 multiplexes the thirty-two channels of data received from the discriminator 34 and sends the resulting multiplexed signal to the press-talk highway 28 at the rate of 2.048 megabits per second.

Referring again to FIG. 2, the paths indicated by dotted arrows in the time-division switch 10, linking the press-talk highways 21 to the press-talk highway 28, are set up when the system is installed and are left permanently connected. The discriminator 34 accordingly always knows which press-talk pushbuttons 9 are depressed.

Next the operation will be described for the case in which a person using the wireless terminal 24 in the top left of FIG. 2 presses the press-talk pushbutton 9.

When its press-talk pushbutton 9 is depressed, this wireless terminal 24 begins in transmitting a carrier signal to the fixed base station 22 in the top left. If the wireless terminal 24 is also equipped with dial pushbuttons for making ordinary telephone calls, the transmitted signal includes information indicating specifically that the press-talk pushbutton 9 was pressed, rather than a pushbutton for making an ordinary call. If the wireless terminal 24 is not equipped for making ordinary telephone calls and the fixed base station 22 can recognize this from the identification code of the wireless terminal 24, then specific press-talk information may be unnecessary, presence of the carrier signal sufficing to indicate that the press-talk pushbutton 9 is depressed. In any case, the fixed base station 22 sends an active press-talk signal to the press-talk trunk 30 by clearing the press-talk flag indicated in FIG. 3 to zero.

The discriminator 34 detects this active press-talk signal. If 1×N communication is already in progress, the discriminator 34 sends return information to that effect; i.e. it sets the clear-to-talk flag in FIG. 3 to one and the busy/free flag to zero. If 1×N communication is not in progress, the discriminator 34 changes the 1×N communication status to in-progress, sends a return code in which the busy/free and clear-to-talk flags both have the value zero, and sends an interrupt signal to the central controller 12. The discriminator 34 also notifies the central controller 12 of the specific channel on which the press-talk pushbutton 9 has been pressed. The central controller 12 executes an interrupt-handling routine that sets up the voice path indicated by solid arrows in FIG. 2 in the time-division switch 10, enabling the voice of the person at the wireless terminal 24 in the top left to be heard by people at other wireless terminals 24 and terminals 4.

When this person has finished talking, he releases the press-talk switch of his wireless terminal 24. The discriminator 34 detects the resulting inactive value of the press-talk flag and notifies the central controller 12. The central controller 12 then clears the path indicated by solid arrows in the time-division switch 10. After this, another person can talk by the same procedure.

Like the system in FIG. 1, the system in FIG. 2 has the advantage that a person who wants to speak only has to press a single pushbutton. Another advantage of the system in FIG. 2 is easy installation, because the press-talk trunk 30 is connected only to the private branch exchange 2. Still another advantage is that the central controller 12 does not have to detect a service code as in the prior art or scan the press-talk trunk as in FIG. 1; it only has to respond to an interrupt signal.

The information contained in the eight-bit time slots in FIG. 3 can be used to provide service features such as the following. The identification code in an incoming time slot may specify a service priority class. In this case the discriminator 34 can interrupt a 1×N call from a lower-priority terminal to permit a call to be made from a higher-priority terminal. The busy/free flags in the outgoing time slots can be used to switch on external speakers at the terminals 4, turn up the volume of the speakers built into the wireless terminals 24, or light an indicator lamp or sound an alerting tone at these terminals. The clear-to-talk flags in the outgoing time slots can be used to control indicator lamps at the terminals 4 and the wireless terminals 24, so that a person who has pressed a press-talk pushbutton 9 can confirm that he is clear to talk. When 1×N communication is in progress, the identification code in the outgoing time slots may indicate the priority of the current speaker's terminal. This enables urgent 1×N calls or calls from the higher-priority terminals to be announced or indicated by an alarm tone, flashing lamp, or other means at the called terminals.

Figure 4:
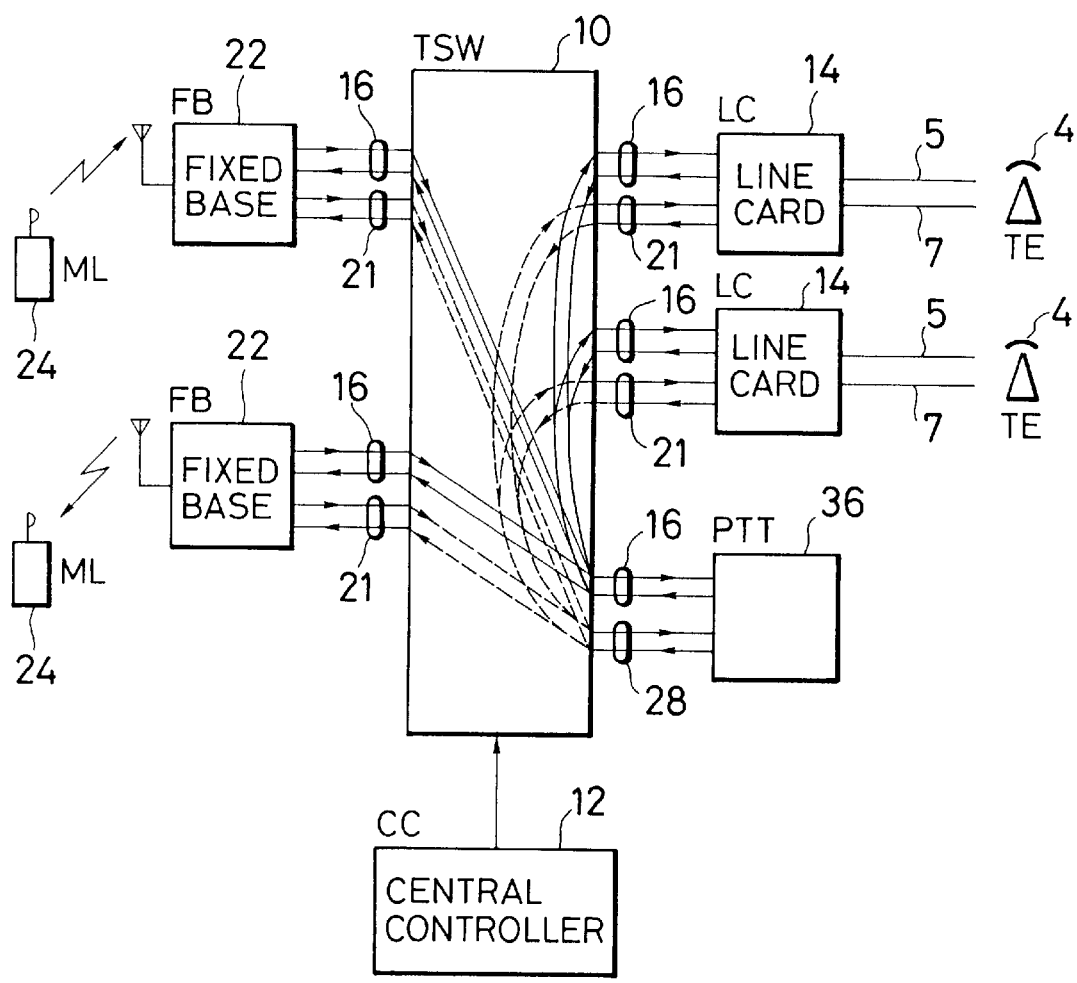

FIG. 4 shows a third novel 1×N communication system. In this system all switching of 1×N communication is carried out in the press-talk trunk 36. Components other than the press-talk trunk 36 are the same as the components with the same reference numerals in FIG. 2, so descriptions will be omitted.

When this system is installed, the paths indicated by dotted arrows in FIG. 4 are permanently set up as they were in FIG. 2. In addition the paths indicated by solid arrows are permanently set up, so that all line cards 14 and fixed base stations 22 are permanently coupled via their internal highways 16 to the press-talk trunk 36.

Figure 5:
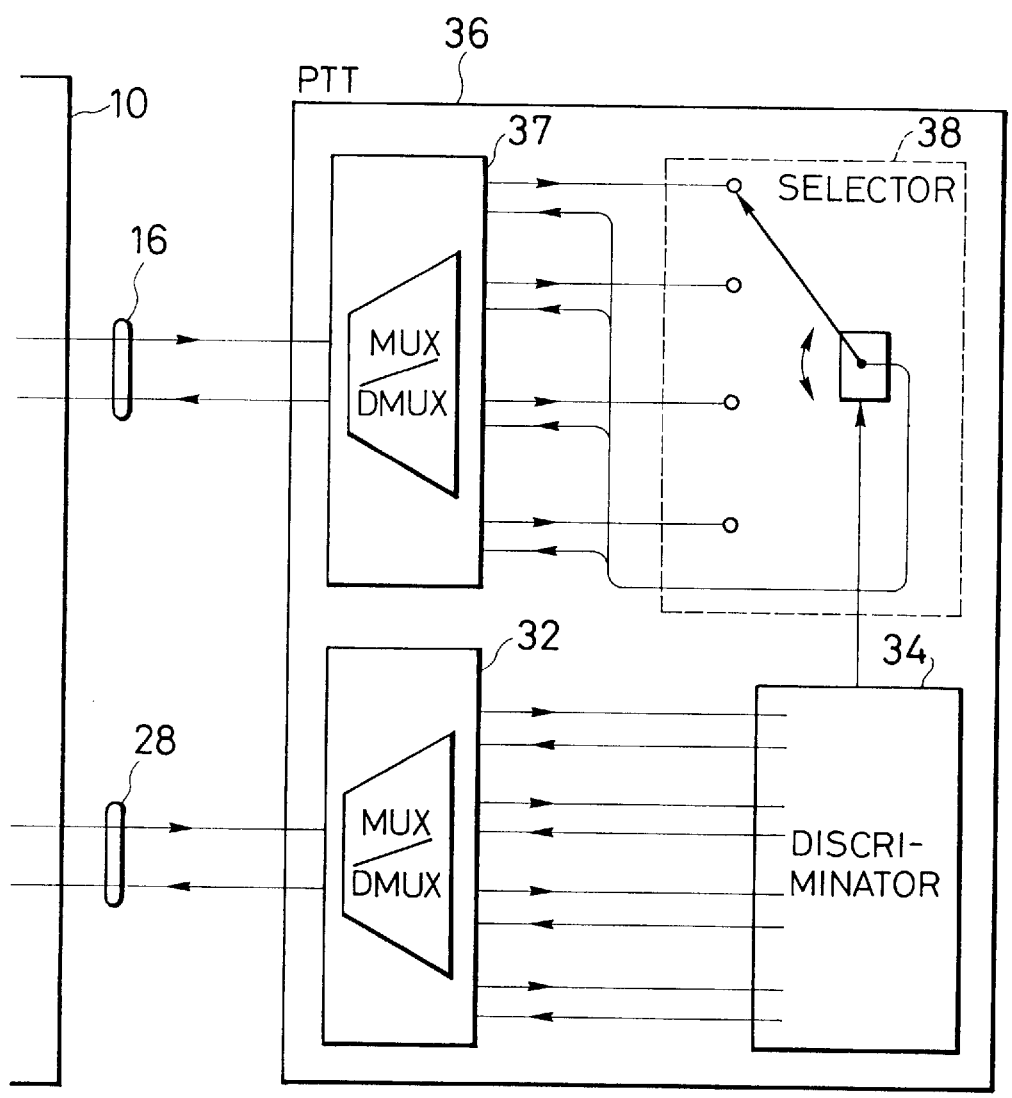
FIG. 5 is a more detailed drawing of the press-talk trunk in FIG. 4.

FIG. 5 shows the structure and interconnections of the press-talk trunk 36 in more detail. The press-talk trunk 36 is coupled to the time-division switch 10 by an internal highway 16 and a press-talk highway 28. The press-talk highway 28 terminates at a multiplexer-demultiplexer 32 which is coupled to a discriminator 34; this part of the press-talk trunk 36 is the same as in FIGS. 2 and 3. The internal highway 16 terminates at a multiplexer-demultiplexer 37, basically identical to the multiplexer-demultiplexer 32, which couples the internal highway 16 to a selector 38.

The multiplexer-demultiplexer 32 and multiplexer-demultiplexer 37 in FIG. 5 are shown as demultiplexing the incoming signal to only four channels, but the actual number of channels may of course be larger, such as the thirty-two channels shown in FIG. 3. The invention is not restricted to any particular number of channels.

The selector 38 selects one of the incoming channels demultiplexes by the multiplexer-demultiplexer 37 and connects it to all of the outgoing channels to be multiplexed by the multiplexer-demultiplexer 37. The selector 38 is controlled by a signal from the discriminator 34.

The operation of the system in FIGS. 4 and 5 is identical to the operation of the system in FIGS. 2 and 3 except that when the press-talk pushbutton 9 is pressed at a terminal 4 or wireless terminal 24, instead of sending an interrupt signal to the central controller 12, the discriminator 34 in the press-talk trunk 36 causes the selector 38 to select the corresponding channel, thereby enabling the person who depressed the press-talk pushbutton 9 to speak to people at the other terminals 4 and wireless terminals 24. When the person releases the press-talk button 9, the discriminator 34 sets the selector 38 to a neutral state in which none of the incoming channels from the multiplexer-demultiplexer 37 is selected.

In FIGS. 4 and 5 the voice signal selected by the selector 38 returns to the terminal from which it originated, as well as to other terminals. If this feature is not desired, the selector 38 can be provided with additional means for canceling the return path to the terminal of origin.

The system shown in FIGS. 4 and 5 has the advantage of implementing 1×N communication with no intervention by the central controller 12. Accordingly, 1×N communication imposes no load on the central controller 12. The 1×N communication system is moreover not restricted by the processing capability of the central controller 12, making it possible to accommodate a large number of terminals 4 and wireless terminals 24.

If the number of terminals to be accommodated exceeds the capacity of a single press-talk trunk, press-talk trunks can be cascaded as described next. For simplicity the time-division switch and multiplexing apparatus will be omitted and the press-talk and voice signals from the terminals will be shown as supplied directly to the press-talk trunks, but the cascading scheme can also be used when press-talk signals and voice signals are routed through the time-division switch as in FIG. 4.

Figure 6:
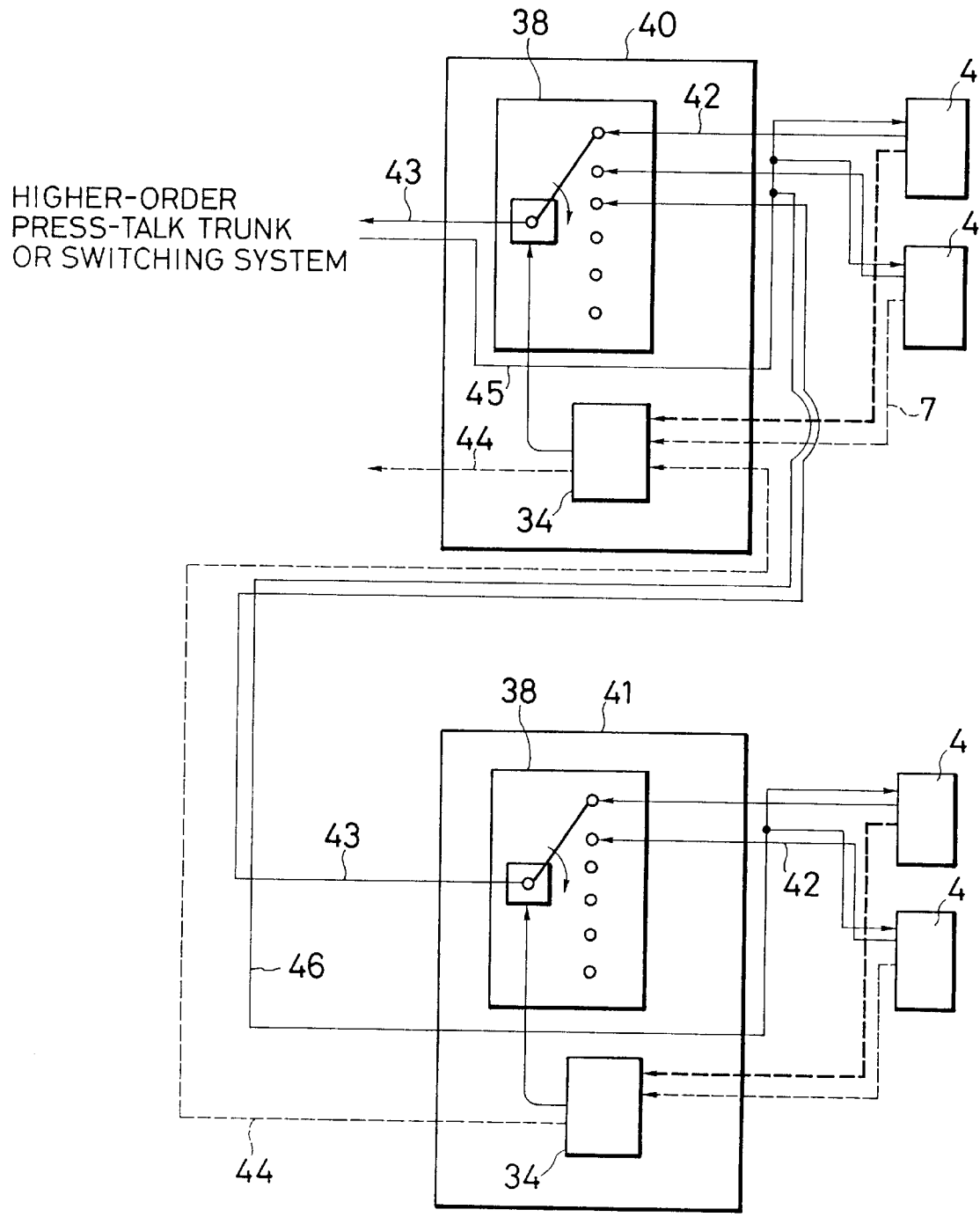
FIG. 6 illustrates the cascading of press-talk trunks.

Referring to FIG. 6, terminals 4 with press-talk pushbuttons 9 are coupled to two press-talk trunks, a master press-talk trunk 40 and a slave press-talk trunk 41, each comprising a discriminator 34 and a selector 38 as described above. In each trunk, terminals 4 are coupled to the selector 38 by wires 42 for carrying voice signals, and to the discriminator 34 by press-talk wires 7 for carrying press-talk signals. The discriminator 34 controls the selector 38. When on or more of the incoming press-talk signals is active, the discriminator 34 selects one active press-talk signal, such as the one that became active first, and the selector 38 selects the corresponding voice signal.

The voice signal selected by the selector 38 is output on a signal line 43. The press-talk signal selected by the discriminator 34 is output on a signal line 44. The press-talk signal output on the signal line 44 is thus active when at least one of the received press-talk signals is active, and is inactive when all of the received press-talk signals are inactive.

The voice signal and press-talk signal output on the signal lines 43 and 44 from the slave press-talk trunk 41 are input to the the master press-talk trunk 40 together with the signals from the terminals 4 coupled to the master press-talk trunk 40. The voice and press-talk signals output from the master press-talk trunk 40 may be input to a higher-order press-talk trunk not shown in the drawing. The voice signal output by the highest-order press-talk trunk is input to a switching system and routed to all the terminals 4. This is indicated schematically in the drawing by signal lines 45 and 46 carrying the finally selected voice signal to all the terminal 4.

If the press-talk pushbutton 9 is pressed at two or more of the terminals 4 in FIG. 6, the cascading scheme results in a single press-talk signal and its corresponding voice signal being selected, even if the terminals are coupled to different press-talk trunks. The master press-talk trunk 40 and slave press-talk trunk 41 therefore provide the same service as the single press-talk trunk in FIGS. 4 and 5, except that they can accommodate more terminals.

If the purpose is only to increase the number of terminals, the cascaded press-talk trunks may all be installed in slots in the mainframe housing of the switching system. Cascading of press-talk trunks is also useful, however, when the terminals are grouped at two or more mutually distant locations. In this case a single press-talk trunk can be provided at each location, so that only a single press-talk signal line 44 and a single pair of voice signal lines 43 and 46 is required between locations, greatly reducing the amount of necessary wiring. For example, the master press-talk trunk 40 may be installed in a private branch exchange located in a main building while the slave press-talk trunk is located in an annex building, thereby reducing wiring between the main building and annex. Cascading of press-talk trunks in this way enables the 1×N communication system to grow flexibly to meet expanding service requirements.

Figure 7:
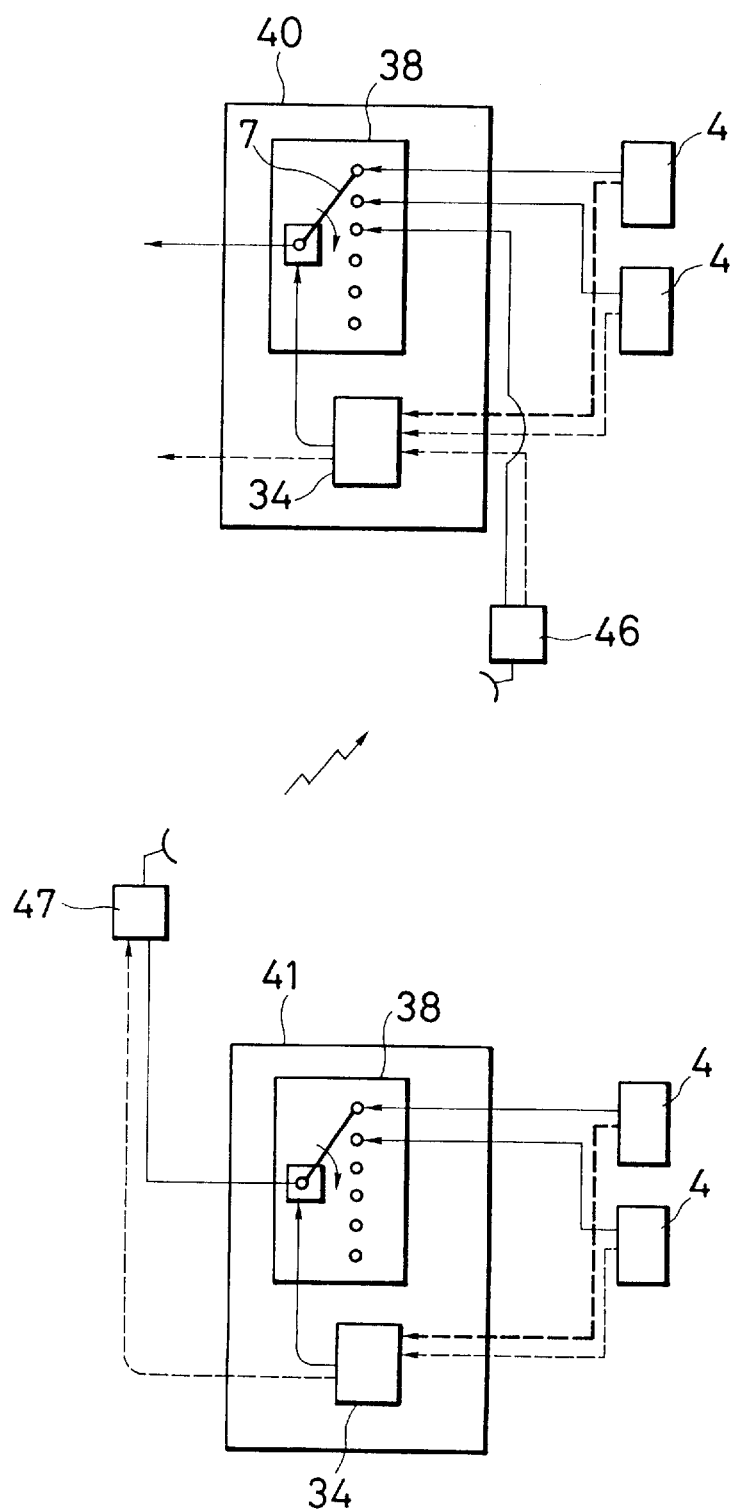
FIG. 7 illustrates the cascading of press-talk trunks via a wireless link.

FIG. 7 shows a similar system in which the slave press-talk trunk 41 is coupled to the master press-talk trunk 40 by a wireless link comprising a pair of antennas 46 and 47. This scheme is particularly advantageous when the master press-talk trunk 40 and slave press-talk trunk 41 are widely separated.

As will be apparent to those skilled in the art, the systems shown in the drawings can be modified in various ways without departing from the spirit and scope of the invention. The signal lines 43, 44, 45, and 46 in FIG. 6 may actually be multiplexed highways. When cascaded trunks are provided at different locations, line cards or fixed base stations may also be provided at these locations. A space-division switch may be used instead of a time-division switch, and frequency-division multiplexing can be employed instead of time-division multiplexing.

What is claimed is:

1. A 1×N communication system, where N is an integer greater than two, comprising:
    at least three terminals for sending and receiving voice signals, having respective press-talk switches for generating press-talk signals with active and inactive states;
    a time division switching system coupled separately to each of said terminals, for switching communication paths among said terminals;
    a press-talk trunk coupled to receive said press-talk signals from said terminals and generate a notification signal when a press-talk signal from any one of said terminals is active, wherein said press-talk trunk comprises I/O ports for respective press-talk signals and said central controller scans said I/O ports; and
    a central controller means coupled to said time division switching system for controlling said time division switching system to cause said time division switching system to send voice signals from said one of said terminals to all other of said terminals, responsive to said notification signal.

2. The system of claim 1 wherein, if two or more press-talk signals are active, said central controller means selects a press-talk signal that became active first.

3. The system of claim 1, wherein said press-talk trunk is coupled to said terminals by wires and receives said press-talk signals directly from said terminals.

4. The system of claim 1, wherein at least one of said terminals is portable, and is coupled to said switching system via a wireless link.

5. A 1×N communication system, where N is an integer greater than two, comprising:
    at least three terminals for sending and receiving voice signals, having respective press-talk switches for generating press-talk signals with active and inactive states;
    a time division switching system coupled separately to each of said terminals, for switching communication paths among said terminals;
    a press-talk trunk coupled to receive said press-talk signals from said terminals and generate a notification signal when a press-talk signal from any one of said terminals is active, wherein said press-talk trunk comprises a discriminator for selecting one active press-talk signal and sending a notification signal for said one active press-talk signal to said central controller; and
    a central controller means coupled to said time division switching system for controlling said time division switching system to cause said time division switching system to send voice signals from said one of said terminals to all other of said terminals, responsive to said notification signal.

6. The system of claim 5, wherein said notification signal is an interrupt signal.

7. The system of claim 5, wherein said press-talk trunk selects, from among all active press-talk signals, a press-talk signal that first became active.

8. A 1×N communication system, where N is an integer greater than two, comprising:
    at least three terminals for sending and receiving voice signals, having respective press-talk switches for generating press-talk signals with active and inactive states;
    a time division switching system coupled separately to each of said terminals, for switching communication paths among said terminals;
    a press-talk trunk coupled to receive said press-talk signals from said terminals and generate a notification signal when a press-talk signal from any one of said terminals is active, wherein said press-talk trunk is coupled to said switching system and receives said press-talk signals from said terminals via said switching system; and
    a central controller means coupled to said time division switching system for controlling said time division switching system to cause said time division switching system to send voice signals from said one of said terminals to all other of said terminals, responsive to said notification signal.

9. A 1×N communication system, where N is an integer greater than two, comprising:
    at least three terminals for sending and receiving voice signals, having respective press-talk switches for generating press-talk signals with active and inactive states;
    a time division switching system coupled separately to each of said terminals, for switching communication paths among said terminals;
    a press-talk trunk coupled to receive said press-talk signals from said terminals and generate a notification signal when a press-talk signal from any one of said terminals is active, wherein said press-talk signals from different terminals are multiplexed by time-division multiplexing; and
    a central controller means coupled to said time division switching system for controlling said time division switching system to cause said time division switching system to send voice signals from said one of said terminals to all other of said terminals, responsive to said notification signal.

10. A 1×N communication system, where N is an integer greater than two, comprising:

at least three terminals for sending and receiving voice signals, having respective press-talk switches for generating press-talk signals with active and inactive states;

a time division switching system coupled separately to each of said terminals, for switching communication paths among said terminals;

a press-talk trunk coupled to receive said press-talk signals from said terminals and generate a notification signal when a press-talk signal from any one of said terminals is active, wherein said press-talk trunk returns to said terminals signals indicating whether 1×N communication is in progress; and a central controller means coupled to said time division switching system for controlling said time division switching system to cause said time division switching system to send voice signals from said one of said terminals to all other of said terminals, responsive to said notification signal.

11. A 1×N communication system, where N is an integer greater than two, comprising:

at least three terminals for sending and receiving voice signals, having respective press-talk switches for generating press-talk signals with active and inactive states;

a time division switching system coupled separately to each of said terminals, for switching communication paths among said terminals;

a press-talk trunk coupled to receive said press-talk signals from said terminals and generate a notification signal when a press-talk signal from any one of said terminals is active, wherein said press-talk trunk returns to each of said terminals a signal indicating whether that terminal is clear for sending voice signals; and a central controller means coupled to said time division switching system for controlling said time division switching system to cause said time division switching system to send voice signals from said one of said terminals to all other of said terminals, responsive to said notification signal.

12. A 1×N communication system, where N is an integer greater than two, comprising:

at least three terminals for sending and receiving voice signals, having respective press-talk switches for generating press-talk signals with active and inactive states;

a time division switching system coupled separately to each of said terminals, for switching communication paths among said terminals;

a press-talk trunk coupled to receive said press-talk signals from said terminals and generate a notification signal when a press-talk signal from any one of said terminals is active, wherein said press-talk trunk switches are pushbutton switches; and a central controller means coupled to said time division switching system for controlling said time division switching system to cause said time division switching system to send voice signals from said one of said terminals to all other of said terminals, responsive to said notification signal.

13. A 1×N communication system, where N is an integer greater than two, comprising:

at least three terminals for sending and receiving voice signals, having respective press-talk switches for generating press-talk signals with active and inactive states;

a switching system coupled to said terminals, for switching communication paths among said terminals;

a press-talk trunk coupled to said switching system, for receiving said press-talk signals and said voice signals from said terminals via said switching system and, when at least one of said press-talk signals is active, selecting an active press-talk signal from one terminal among said terminals and sending voice signals from that one terminal back via said switching system to other terminals among said terminals.

14. The system of claim 13, wherein said press-talk trunk comprising:

a discriminator for selecting an active press-talk signal; and a selector controlled by said discriminator, for receiving said voice signals and selecting one of said voice signals for output from said press-talk trunk.

15. The system of claim 13, wherein at least one of said terminals is portable, and is coupled to said switching system via a wireless link.

16. The system of claim 13, wherein press-talk signals from different terminals are multiplexed by time-division multiplexing, and said press-talk trunk also comprises a multiplexer-demultiplexer.

17. The system of claim 13, wherein said press-talk trunk returns to said terminals signals indicating whether 1×N communication is in progress.

18. The system of claim 13, wherein said press-talk trunk returns to each of said terminals a signal indicating whether that terminal is clear for sending voice signals.

19. A 1×N communication system, where N is an integer greater than two, comprising:

as least three terminals for sending and receiving voice signals, having respective press-talk switches for generating press-talk signals with active and inactive states;

a slave press-talk trunk means, coupled to receive said voice signals and said press-talk signals from at least two of said terminals, for providing a press-talk signal that is inactive when all received press-talk signals are inactive and active when at least one received press-talk signal is active, for selecting one voice signal corresponding to one active received press-talk signal, and for providing said one voice signal as an output;

a master press-talk trunk means, coupled to received the press-talk signal and the voice signal output from said slave press-talk trunk and at least one other press-talk signal and voice signal, for selecting a voice signal corresponding to one active received press-talk signal, and providing the selected voice signal as an output; and a switching means for receiving the selected voice signal output from said master press-talk trunk and for routing the selected voice signal to all of said terminals.

20. The system of claim 19, wherein said slave press-talk trunk means and said master press-talk trunk means each comprises:

a discriminator means for selecting an active press-talk signal; and a selector means, controlled by said discriminator, for receiving said voice signals and selecting one of said voice signals for an output from said press-talk trunk.

21. The system of claim 19, wherein said slave press-talk trunk means is directly coupled to at least two of said terminals.

22. The system of claim 19, wherein said slave press-talk trunk means is coupled to said master press-talk trunk by a wireless link.

23. The system of claim 19, also comprising a higher-order press-talk trunk coupled to receive the voice signal output by said master press-talk trunk means.

* * * * *

UNITED STATES PATENT AND TRADEMARK OFFICE
CERTIFICATE OF CORRECTION

PATENT NO. : 5,884,162
DATED : March 16, 1999
INVENTOR(S) : Shigeru Yamazaki; Akihiko Hiramatu; Kazuo Seko It is certified that error appears in the above-indentified patent and that said Letters Patent is hereby corrected as shown below:

Col. 1, line 60, after "communication" insert -- system --.

Col. 2, line 32, "FIG. 3" should be -- FIG. 4 --.

Col. 2, line 44, after "The" delete "invented".

Col. 2, line 44, after "system" insert -- according to the present invention --.

Signed and Sealed this

Seventh Day of December, 1999

Q. TODD DICKINSON

*Attest:*

*Attesting Officer*     Acting Commissioner of Patents and Trademarks